R. Daniels,
Vegetable Crusher.
No. 90,429. Patented May 25, 1869.
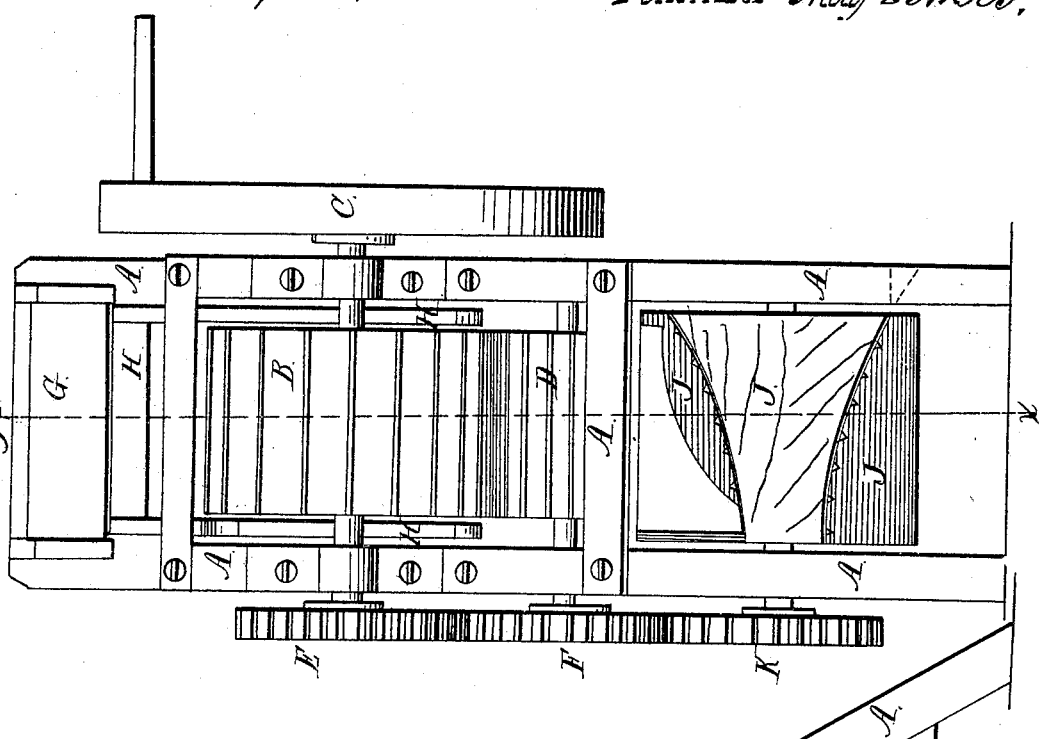
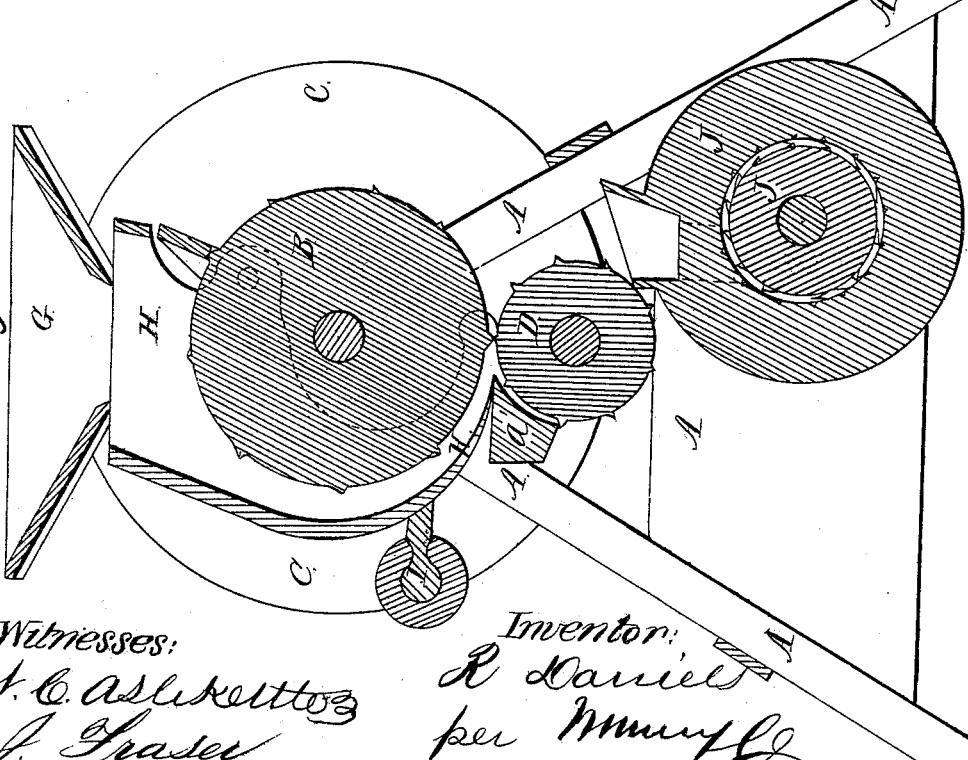
Witnesses:
W. C. Ashketts
J. Fraser
Inventor:
R. Daniels
per Munn & Co.
Attorneys

United States Patent Office.

REUBEN DANIELS, OF WOODSTOCK, VERMONT.

Letters Patent No. 90,429, dated May 25, 1869.

IMPROVED VEGETABLE-CRUSHER.

The Schedule referred to in these Letters Patent and making part of the same

*To all whom it may concern:*

Be it known that I, REUBEN DANIELS, of Woodstock, in the county of Windsor, and State of Vermont, have invented a new and improved Vegetable-Crusher; and I do hereby declare that the following is a full, clear, and exact description thereof, which will enable those skilled in the art to make and use the same, reference being had to the accompanying drawings, forming part of this specification, in which—

Figure 1 is a front view of my improved machine, part being broken away to show the construction.

Figure 2 is a vertical section of the same, taken through the line *x x*, fig. 1.

Similar letters of reference indicate corresponding parts.

My invention has for its object to furnish an improved machine, by means of which apples and other fruits, wheat, buckwheat, corn, &c., may be crushed; and It consists in so constructing and arranging two ribbed rollers that they shall mutually scrape or clean each other while the fruit or other substance is being crushed or squeezed between the ribs thereof, as will be hereinafter more fully described.

A is the frame of the machine, which supports the operating-parts, and to which the bearings of the rollers are attached in the ordinary manner.

B is the upper and larger roller, which revolves in bearings attached to the frame A, and to the projecting end of one of the journals of which, the crank-wheel C is attached.

The crank-wheel C should be made large so as to serve at the same time as a fly-wheel.

D is the lower or smaller roller, which is placed directly beneath the roller B, and the journals of which revolve in adjustable bearings attached to the frame A, so that the roller D may be moved nearer to or further from the roller B, as may be desired, reference being had to the work to be done.

The roller B is made of about twice the diameter of the roller D, and to the faces of both rollers are attached, or upon them are formed longitudinal flanges or teeth, the number of said flanges or teeth being the same upon one roller as upon the other.

To the projecting end of the journal of the roller B is attached a gear-wheel, E, the teeth of which mesh into the teeth of the gear-wheel F, attached to the projecting end of the journal of the lower roller D.

The gear-wheels E and F are made of about the same size, and with the same number of teeth, so that the larger roller B may be revolved in exactly the same time as the smaller roller D. The effect of this is that the surface of the larger roller B moves with greater velocity than the surface of the smaller roller D. The effect of this is to cause the flanges or teeth of each roller to scrape over the surface or space between the flanges or teeth of the other roller, thus keeping the faces of the rollers clear, and preventing all clogging.

G is a stationary hopper, attached to the upper part of the frame A, into which the material to be crushed is placed, and from which it is conducted to the rollers through the scroll-hopper H.

The scroll-hopper H is made in about the shape shown in the drawings, and is pivoted at its upper end to the frame A, as shown in dotted lines in fig. 2.

The scroll-hopper is so formed as to overlap the ends of the roller B, while its lower end terminates in the space between the said rollers B and D, as shown in fig. 2.

The throat of the hopper H, or the space between said hopper and the roller B, gradually decreases in size, so that the material passing through it may be gradually flattened or reduced to such a shape that it may readily enter between the rollers B and D, to be crushed by said rollers.

I is a weight attached to the rear side of the hopper H, and which should be of such a size as to hold the hopper H forward with sufficient force to flatten the material, as it passes down through said hopper, while, at the same time, should a stone or other hard substance enter the hopper H, it can give, and thus prevent breakages.

The lower end of the scroll-hopper H is supported just above the cross-beam *a'* of the frame A, which said beam is so formed and placed as to form a continuation of the throat of the hopper H, when said hopper is pushed back.

J is a grinding-mill placed beneath the roller D, in such a position as to receive the crushed material as it comes from the rollers B and D, and hull it or grind it to the desired fineness.

In the drawings the mill J is represented as an ordinary cone or coffee-mill, but its form is immaterial.

The mill J is driven by a gear-wheel K, of the same size as the gear-wheels E and F, the teeth of which mesh into the teeth of the gear-wheel F, as shown in fig. 1, or in any other convenient way.

The grinding-mill J is used for grinding or hulling corn, wheat, buckwheat, and other material that requires to be ground or hulled, after being crushed by passing between the rollers B and D.

When apples, and other material that does not require to be ground, are passed through the machine, the mill J should be detached and removed.

I claim as new, and desire to secure by Letters Patent—

Two or more crushing-rollers of different diameters, provided with an equal number of ribs, and arranged and operated in such a manner that they shall make the same number of revolutions, and the respective ribs scrape or clean the opposite roller while the fruit or other substance is being crushed between said ribs, substantially as specified.

The above specification of my invention signed by me, this 11th day of February, 1868.

REUBEN DANIELS.

Witnesses:
JOHN ALISON FRASER,
JAMES T. GRAHAM.